United States Patent Office 2,813,424
Patented Nov. 19, 1957

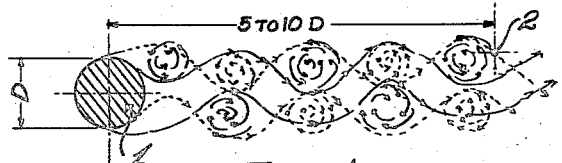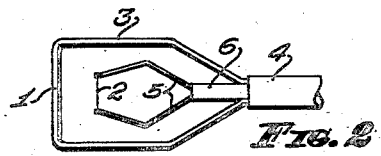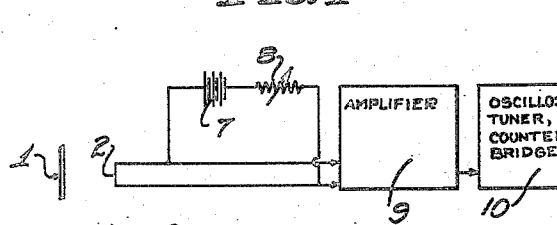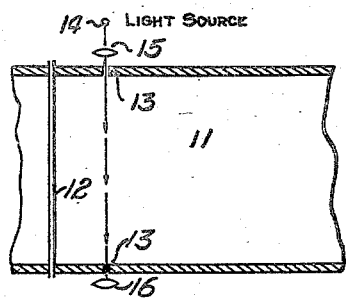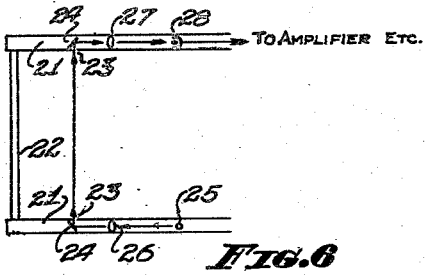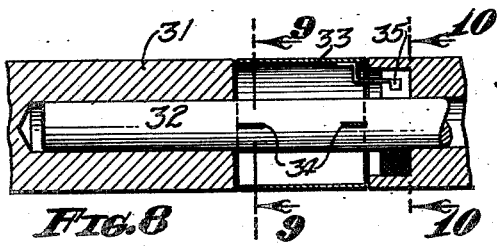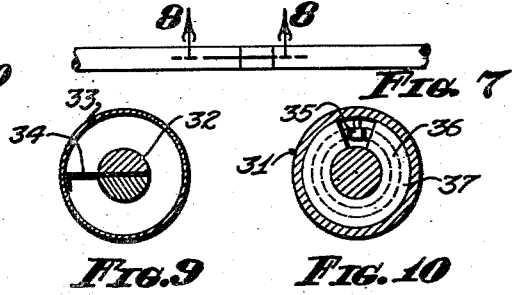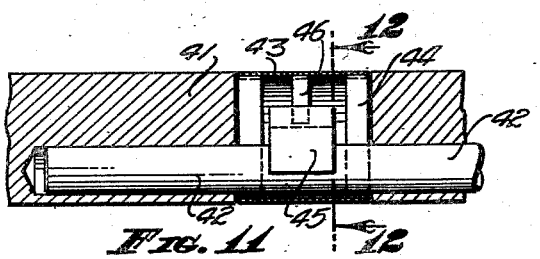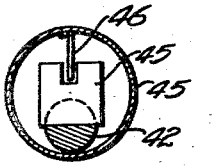

2,813,424

MEANS OF MEASURING FLUID VELOCITY

Hans W. Liepmann and Anatol Roshko, Pasadena, Calif., assignors to California Institute Research Foundation, Pasadena, Calif., a corporation of California Application August 9, 1952, Serial No. 303,536

2 Claims. (Cl. 73—204)

Our invention relates to means of measuring fluid velocities and included in the objects of our invention are:

First, to provide a means of measuring fluid velocities which may be adapted to the measurement of the velocity of either liquid or gaseous streams or the movement of a body immersed in liquid or gas.

Second, to provide a means of measuring fluid velocities which is applicable to the measurement of fluid velocities below or above sonic velocities.

Third, to provide a fluid velocity meter which is sensitive to the frequency of the shedding vortices produced in the wake of a bar placed in a stream of liquid or gas, the frequency of such shedding vortices being proportional to the velocity of the fluid.

Fourth, to provide a fluid velocity meter which being sensitive only to the frequency of the shedding vortices is independent of temperature and pressure variations within a wide range, and which once calibrated, the meter calibration does not change.

Fifth, to provide a fluid velocity meter which may be quite compact and which, as the velocity range to be measured increases, may be made smaller in size, thus minimizing the effect of the gas stream due to the presence of the meter.

With the above and other objects in view as may appear hereinafter, reference is directed to the accompanying drawings in which:

Figure 1 is a diagrammatical view illustrating the essential elements of our fluid velocity meter.

Figure 2 is a plan view showing one form of our fluid velocity meter.

Figure 3 is a side view thereof.

Figure 4 is a typical block wiring diagram employed to measure or record velocities by our means and methods.

Figure 5 is a diagrammatical view showing a modified form of our fluid velocity meter.

Figure 6 is another diagrammatical view showing a further modified form of our fluid velocity meter.

Figure 7 is a fragmentary view showing a further modified form of our fluid velocity meter.

Figure 8 is an enlarged fragmentary, longitudinal view through 8—8 of Figure 7.

Figures 9 and 10 are transverse, sectional views thereof through 9—9 and 10—10 of Figure 8.

Figure 11 is a fragmentary, longitudinal, sectional view similar to Figure 8 showing a further modified form of our fluid velocity meter; and Figure 12 is a transverse, sectional view thereof through 12—12 of Figure 11.

Figure 13 is a diagrammatical view similar to Figure 1 showing several sensing elements to facilitate measurement of the direction as well as the velocity of the fluid stream.

Our means of measuring fluid velocities utilizes the phenomena known as the "Karman Trail"; that is, if a cylinder is placed in a fluid stream, vortices are produced in the wake of the cylinder. These vortices shed or trail away from the cylinder at a frequency which is proportional to the flow velocity and inversely proportional to the cylinder diameter. Thus the formula may be stated:

$$N \doteq K(V/D)$$

where N is the shedding frequency of the vortices; V is the flow velocity; D is the cylinder diameter and K, a constant. The factor K is practically constant over a wide range of Reynolds numbers. Thus $$K=0.21 \quad 500<R<100,000$$

Three typical velocity ranges are as follows:

(1) Meteorological, air ventilation, etc.:
 $V=0.2$ to 20 meters/sec.
 $D=0.5$ cm.
 $N=5$ to 800 C. P. S.

(2) Low speed aerodynamics:
 $V=10$ to 100 meters/sec.
 $D=0.05$ cm.
 $N=5$ to 50 kc.

(3) High speed aerodynamics:
 $V=10$ to 400 meters/sec.
 $D=0.1$ cm.
 N up to 80 kc.
 $D=0.01$ cm.
 N up to 800 kc.

Reference is first directed to Figures 1–4. Here a probe bar or cylinder 1 is shown. In Figure 1 the wake indicating the region in which the shedding vortices occur is illustrated.

The vortices shed alternately from opposite sides of the cylinder and trail rearwardly therefrom the wake alternating between the solid line and dotted line condition shown in Figure 1. At a distance selected as between five and ten times the diameter of the rod there is placed a sensing element or fine wire 2.

The sensing element is preferably placed so that only those vortices shedding from one side of the cylinder pass across the sensing element.

The rod 1 and wire 2 may extend across the duct through which the fluid is passing or may be incorporated in a probe structure such as shown in Figures 2 and 3. In this case the bar 1 forms one end of a frame or probe mount 3, the opposite side of which converges and is secured in a supporting tube or support 4. The sensing element or wire 1 may be supported by a yoke or detector mount 5 formed of a pair of conductors which extend into an insulating stem 6 adapted to pass through the tube 4.

With reference to Figure 4, the sensing element or wire 2 is heated from a suitable supply such as a battery 7 regulated by a resistance 8. The temperature of the sensing element or wire 2 will fluctuate in response to the frequency of the shedding vortices impinging thereon.

This causes a fluctuation in output current which may be fed into an amplifier 9 and then into an oscilloscope tuner, impulse counter or bridge circuit 10. The mode of amplifying and indicating or recording the signals produced by the fluctuating temperature in the sensing element 2 may follow conventional practice.

Reference is now directed to Figure 5. In the modification here shown the fluid velocity meter is represented as mounted in a fluid duct 11. The rod 12 is shown as traversing the duct. At the appropriate distance downstream from the bar 2, the duct is provided with apertures or windows 13. A light source 14 is focused by suitable lens system 15 so as to produce a beam of small diameter passing across the duct and collected by a second lens system 16 for focusing upon a photocell 17. The output from the photocell is amplified in a conventional manner. In this arrangement the shedding vortices produce a fluctuation in light intensities, the frequency of which corresponds to the frequency of the shedding vortices.

Reference is directed to Figure 6. The arrangement here shown is similar to Figure 5. In this case a pair of supporting tubes 21 carry the probe bar 22. The supporting tubes are provided with small apertures 23 and mirrors 24 so arranged as to deflect light along the axes of the tubes. One tube is provided with a light source 25 and focusing lens 26 so as to produce the desired narrow beam of light across the appropriate region downstream of the bar 12. The other tube is provided with a condensing lens system 27 so as to focus on a photocell 28. The output of the photocell is amplified in a conventional manner.

Reference is now directed to the modification shown in Figures 7–10. In the previously described structures, the sensing element was spaced from the probe bar. However, the shedding vortices set up vibrations in the bar itself which are proportinoal to their frequencies. A pair of co-axial supporting rods 31 are provided which are joined by a connecting rod 32 of smaller diameter. The confronting ends of the supporting rods are bridged by a sensing element 33 which may be equal in diameter to the supporting rods, but which does not actually contact them. The sensing cylinder is made as light as possible and is supported from the supporting rod by flexure leaves 34. Secured to the sensing cylinder 33 is a movable armature 35 adapted to be disposed in an air gap formed of an annular, fixed magnet 36 disposed within a solenoid coil 37. In this arrangement, vibration of the sensing cylinder 33 may be picked up by the coil 37 and amplified in a conventional manner.

Reference is now directed to Figures 11 and 12. This construction is in most respects similar to the preceding construction except that detection is by a capacity pick-up means. A pair of supporting rods 41 are joined by an eccentrically disposed connecting rod 42. The gap between the supporting rods is bridged by a sensing cylinder 43 supported from the connecting rod 42 by flexure leaves 44. The connecting rod 42 supports a capacitance pick-up unit 45 and a stem 46 capable of affecting the capacitance pick-up unit which extends from the sensing cylinder 43 into operative relation with the pick-up unit.

Our method of measuring fluid velocity consists essentially in positioning a rod in a fluid stream, the rod having a diameter determined by the range of velocities to be measured; in effect, the diameter of the rod being inversely proportional to the frequency range to be measured. The frequency of the shedding vortices is then measured either by the direct effect of these shedding vortices on the rod itself or the effect of the frequency of these vortices on a sensing element spaced from the probe rod.

It should be noted that while the probe rod is shown as round, it may be polygonal in cross section, or may have an air foil cross section. However shaped, the rod is so arranged as to produce the requisite shedding vortices under the conditions in which velocity measurement is desired.

It will be observed that it is the frequency rather than intensity of the vortices which is measured so that velocity measurement is independent of intensity. However, it is possible to measure the direction of the fluid stream, for as the axis of the wake passes across the sensing wire, vortices shedding from both sides of the cylinder will impinge on the sensing wire doubling the frequency of the impulses. Thus if direction of fluid flow is to be measured, several sensing wires or the like may be employed equally spaced about the probe rod as indicated by 2a in Figure 13 to increase the range of direction measured. Each sensing wire 2a is connected in the same manner as the sensing wire 2 to a heating source and a conventional amplifier and indicating or recording means.

Having thus described certain embodiments and applications of our invention, we do not desire to be limited thereto, but desire to claim all novelty inherent in the appended claims.

We claim:

1. A fluid velocity detector, comprising: a support adapted to be positioned in a fluid stream; a probe mount extending upstream of said support; a probe element supported at the upstream end of said mount and transversely to said fluid stream to produce shedding vortices flowing downstream of said probe element at a rate proportional to the velocity of said fluid stream; a detector mount also extending upstream of said support; an electrical resistance detector element supported by said detector mount downstream of said probe element in the path of said shedding vortices; electrical means utilizing said detector mount for heating said detector element whereby said vortices as they pass said detector element fluctuatingly extract heat therefrom in proportion to the velocity of said fluid stream and correspondingly vary the resistance thereof; and means connected with said detector element for measuring the frequency of said resistance fluctuation thereby to measure the velocity of said fluid stream.

2. A fluid velocity meter, comprising: a probe wire disposed in a fluid stream to produce a stream of spaced shedding vortices flowing downstream at a rate proportional to the velocity of said fluid stream; a detector wire located in the path of said shedding vortices; means for heating said detector wire whereby said vortices as they pass said detector wire fluctuatingly extract heat therefrom at a frequency proportional to the velocity of said stream thereby to vary correspondingly the resistance of said detector wire; means connected with said detector element for measuring the frequency of resistance change in said detector wire thereby to measure the velocity of said fluid stream.

References Cited in the file of this patent

UNITED STATES PATENTS

| | | |
|---|---|---|
| 1,215,135 | Fisher | Feb. 6, 1917 |
| 1,924,139 | Thomas | Aug. 29, 1933 |
| 1,935,445 | Heinz | Nov. 14, 1933 |
| 1,958,252 | Singleton et al. | May 8, 1934 |
| 2,389,615 | Eder | Nov. 27, 1945 |

FOREIGN PATENTS

| | | |
|---|---|---|
| 646,261 | France | July 10, 1928 |